United States Patent Office 3,845,087
Patented Oct. 29, 1974

3,845,087
ISOMERIZATION OF 1,2-DIGLYCERIDES
TO 1,3-DIGLYCERIDES
Willibrordus Theodorus Maria de Groot, Maasland, Netherlands, assignor to Lever Brothers Company, New York, N.Y.
No Drawing. Filed Nov. 10, 1971, Ser. No. 197,452
Claims priority, application Great Britain, Nov. 13, 1970, 54,188/70
Int. Cl. C11c 3/00, 3/14
U.S. Cl. 260—410.7
6 Claims

ABSTRACT OF THE DISCLOSURE 1,2-Diglycerides are isomerized to the corresponding 1,3-diglycerides by maintaining them in the solid state above ambient temperature, especially within 20° C. of their initial melting point. The 1,3-diglycerides can, for instance, be esterified to give important edible triglycerides.

This invention relates to a process for the production of 1,3-isomers of diglycerides, triglycerides produced from the 1,3-isomers and their uses.

It has long been known that diglycerides, when dissolved or in the liquid state, isomerize to give an equilibrium mixture of 1,3- and 1,2-diglycerides. The ratio of 1,3- to 1,2-diglyceride at equilibrium is dependent on, for instance, temperature. As is shown by the work of Crossley et al., J. Chem. Soc. 1959, 760 and of Freeman & Morton, J. Chem. Soc. (C), 1966, 1710 with decrease in temperature the proportion of 1,3- at equilibrium usually increases. This increase is however comparatively slight. The weight ratio of 1,3- to 1,2-diglyceride usually remains less than 3.5:1.

Many methods have been proposed for preparing 1,3-diglycerides. For example U.S. 2,626,952 and U.S. 3,012,-890 describe processes in which a 1,3-diglyceride is preferentially crystallized from an interesterification mixture of triglyceride and glycerine. U.S. 3,312,724 describes a modification in which preferential crystallization occurs whilst a solvent is evaporated from the mixture. U.S. 3,492,130 describes the application of such a process to the preparation of 1,3-dipalmitin.

It has now been discovered that isomerization of diglycerides occurs in the solid state and favours the 1,3-diglyceride to an unexpected extent. The isomerization is believed to be intermolecular. A process useful for exploiting this finding industrially has also been discovered. By this process 1,3-diglycerides of desired structure, and from these triglycerides of desired structure can be prepared in a convenient manner.

The invention therefore provides a process for producing the 1,3-isomer of a diglyceride in which a system comprising a 1,2-isomer of the diglyceride is maintained in the solid state above ambient temperature to isomerize the 1,2-isomer to the 1,3-isomer.

Although the invention in its broadest aspect is not limited to maintaining the system until the 1,2-diglyceride has isomerised so that the weight ratio of 1,3-isomer to 1,2-isomer is greater than a particular value, a special advantage of the invention is that a weight ratio greater than 6:1 can be obtained. Indeed preferably the system is maintained until a weight ratio greater than 9:1 is obtained. Although it is believed that an equilibrium is involved isomerization can occur in a process according to the invention to such a stage that substantially all the diglyceride is in the form of the 1,3-diglyceride or at least the weight ratio of 1,3-isomer to 1,2-isomer is greater than 100:1. Preferably the system is maintained until the weight ratio of 1,3-isomer produced to 1,2-isomer remaining is greater than 6:1.

In describing the invention the word "equilibrium" is used. It will be appreciated that strictly such an equilibrium is never completely attained; it is approached asymptotically. Temperature is one factor which affects the speed with which equilibrium is approached. In general, the higher the temperature the more rapidly will equilibrium be approached. Convenient times are from 2 hours, preferably 2 days to 2 months, preferably to 20 days.

One aspect of the invention is therefore a process for preparing a 1,3-diglyceride in which a system comprising a 1,2-diglyceride is maintained in the solid state within 20° C. of the initial melting point of the system. Initial melting point is mentioned because as isomerisation proceeds the melting point of the system will usually increase. This is because usually the 1,3-isomer has a higher melting point than the 1,2-isomer. It is preferred that the temperature at which the system is maintained is above 25° C., particularly preferably above 40° C., better, above 60° C. Of course it is always a requirement that the system be solid.

Solid systems comprising a 1,2-isomer of a diglyceride can be prepared by many methods. The present invention is applicable to all such systems. Such a system can be prepared, for instance, by the process described and claimed in Belgian Patent specification 763,889 or by interesterification reactions such as between a triglyceride and glycerine. Other examples are given above.

Although particularly applicable to the preparation of 1,3-diglycerides in which the acid moieties are fatty acids, the invention also relates to the preparation of 1,3-diglycerides in which glycerol is esterified with other acids.

When the glycerol is esterified with fatty acids the 1,3-diglycerides prepared according to the invention are useful in many industrial applications particularly as foodstuffs or as intermediates for foodstuffs. The invention can also be used to prepare triglycerides which are useful as substitutes for natural products or as improvements over natural products. Also, in recent years there has been a growing awareness of the importance as dietary factors of particular triglycerides. The invention provides an effective way of preparing such dietary factors. Significant fatty acids for such purposes are straight-chain $C_4$ to $C_{24}$ fatty acids, particularly significant are straight-chain $C_{14}$ to $C_{20}$ fatty acids especially the even-numbered acids but including, although normally present in natural products only in trace amounts, odd-numbered fatty acids.

A particularly costly natural product is cocoa-butter and the invention enables the preparation, by suitable esterification of the 1,3-isomer produced, of useful substitutes. Analyses of cocoa-butter are given, for example, in Wissebach, "Pflanzen- and Tierfette" in Handbuch der Lebensmittelchemie, Vol. 4, pages 9–180, Springer, Berlin, 1969 and Jurriens and Kroesen, J. Am. Oil Chem. Soc.; 1965, 42 914. Particularly significants are $C_{16}$ and $C_{18}$ fatty acids, especially palmitic, stearic and oleic acids. One preferred 1,3-isomer contains palmitic and stearic acid; another contains only stearic acid.

One aspect of the invention is a 1,3-isomer of a diglyceride produced according to the invention by isomerization in the solid state of a 1,2-diglyceride.

Another aspect of the invention is a process for preparing a triglyceride by esterifying a 1,3-diglyceride produced according to the invention. Suitable methods of esterification are well-known and for instance are described in Houben-Weyl and Rodd. Agents that can be used include acid anhydrides and acid chlorides.

The same acids are in general preferred for the esterification as are preferred for the 1,3-diglyceride. In the case of a cocoa-butter substituted a particularly preferred acid is oleic acid. An aspect of the invention is the preparation of confectionery products using triglycerides prepared according to the invention and designed to act as cocoa-butter substitutes.

After the 1,3-isomer has been produced by isomerization, it is preferably isolated from the system, preferably by crystallisation. Hexane is a preferred solvent.

The invention will now be illustrated by the following Examples.

EXAMPLES I–VI

Table I gives analysis results for isomerization in the solid state of systems consisting only of palmitylstearyldiglyceride.

TABLE I

| Example | Ratio of 1,3- to 1,2 Before | Ratio of 1,3- to 1,2 After | Isomerization conditions Time (days) | Isomerization conditions Temperature (° C.) |
|---|---|---|---|---|
| 1 | 60:40 | 65:35 | 15 | 20 |
| 2 | 65:35 | 94:6 | 2 | 50 |
| 3 | 92:8 | 99:1 | 3 | 50 |
| 4 | 75:25 | 95:5 | 1 | 60 |
| 5 | 75:25 | 97:3 | 3 | 60 |
| 6 | 75:25 | 97.7:2.3 | 4 | 60 |

EXAMPLES VI–XI

Table II gives analysis results for isomerization in the solid state of palmitylstearyldiglycerides prepared according to Belgian Patent specification 763,889.

TABLE II

| Example | Ratio of 1,3- to 1,2 Before | Ratio of 1,3- to 1,2 After | Isomerization conditions Time | Isomerization conditions Temperature (° C.) |
|---|---|---|---|---|
| 4 | 75:25 | 84:16 | 30 days | 20 |
| 5 | 75:25 | 95.5:4.5 | 7 months | 20 |
| 6 | 84:16 | 92:8 | 1 day | 50 |
| 7 | 85:15 | 97:3 | 3 days | 50 |
| 8 | 75:25 | 81:19 | 7 hours | 55 |
| 9 | 74:26 | 96:4 | 1 day | 55 |
| 10 | 74:26 | 95.5:4.5 | 3 days | 55 |
| 11 | 74:26 | 97:3 | 4 days | 55 |

EXAMPLE XII

A system consisting of stearyloleyldiglyceride (ratio of 1,3- to 1,2- of 75:25) prepared according to Belgian Patent specification 763,889 was maintained at 35° C. (3° C. below the melting point of the starting system) for 5 days. The product obtained had a melting point of 43° C. and at ratio of 1,3- to 1,2- of 94:6.

EXAMPLE XIII

A system comprising 1,2-stearylpalmitylglyceride was prepared according to a process according to Belgian Patent specification 763,889 as follows.

1995 g. glycidylstearate (content 88%, 5 mole), 1315 g. palmitic acid (5 mole) and 3 mole percent of a quaternary ammonium catalyst were heated to 100° C. and kept at the temperature for 2 hours. 3270 g. of crude product was obtained of the following composition:

| | Percent |
|---|---|
| Monoglyceride | 5 |
| 1,2-diglyceride | 29 |
| 1,3-diglyceride | 56 |
| Fatty acid/glycidylester | 6 |
| Triglyceride | 4 |

The crude product was maintained at 50° C. as a powder in 200 g. batches. Analysis results are given in Table III.

TABLE III

| Analysis | 0 Hours | 17 Hours | 40 Hours | 65 Hours | 160 Hours |
|---|---|---|---|---|---|
| Monoglyceride | 5 | 5 | 5 | 5 | 5 |
| 1,2-diglyceride | 29 | 22 | 15 | 11 | 5 |
| 1,3-diglyceride | 56 | 63 | 70 | 74 | 80 |
| Glycidyl ester/fatty acid | 6 | 6 | 5 | 5 | 5 |
| Triglyceride | 4 | 4 | 5 | 5 | 5 |

EXAMPLE XIV

A system consisting of 74.6% 1,3-capryl($C_{10}$)diglyceride and 25.4% 1,2-capryl($C_{10}$)diglyceride was maintained in the solid state at 33° C. Trace amounts of tetraethylammonium bromide were present. After eight days the percentage of 1,3- had increased to 83.

EXAMPLE XV

The system obtained in Example XIV was maintained in the solid state at 33° C. for a further seven days. The percentage of 1,3-capryl($C_{10}$)diglyceride increased to 90.

EXAMPLE XVI

A system consisting of 71.2% 1,3-caproyl($C_6$)palmityl ($C_{16}$)diglyceride and 28.8% of 1,2 isomers was maintained in the solid state at 26° C. for 7 days. The percentage of 1,3-isomer had increased to 89.9.

EXAMPLE XVII

A system consisting of 74% 1,3-capryl palmityl diglyceride and 26% of 1,2-isomers was maintained at 32° C. for 7 days. The percentage of 1,3-isomer had increased to 91.2.

What is claimed is:

1. A process for preparing the 1,3-isomer of a diglyceride of $C_4$ to $C_{24}$ straight-chain fatty acids in which a solid 1,2-diglyceride is maintained in the solid state within 20° C. of the initial melting point for from about 2 hours to about 2 months to isomerize the 1,2-isomer to the 1,3-isomer until the weight ratio of the 1,3-diglyceride to the 1,2-diglyceride is greater than 6:1.

2. A process according to Claim 1 in which the diglyceride is stearyldiglyceride.

3. A process according to Claim 1 in which the diglyceride is palmitylstearyldiglyceride.

4. A process according to Claim 1 comprising the additional step of esterifying the 1,3-diglyceride with a $C_4$ to $C_{24}$ fatty acid to produce a triglyceride.

5. A process according to Claim 4 in which the 1,3-diglyceride is stearyldiglyceride and the 1,3-diglyceride is esterified with oleic acid.

6. A process according to Claim 4 in which the 1,3-diglyceride is palmitylstearyldiglyceride and the 1,3-diglyceride is esterified with oleic acid.

References Cited

Lutton, "Technical Lipid Structures," J. Am. Oil Chemists Soc. 49, pp. 1–9 (1972).

LEWIS GOTTS, Primary Examiner

DIANA G. RIVERS, Assistant Examiner

U.S. Cl. X.R.

260—405.6, 410.8, 491; 426—194